United States Patent
Fleury et al.

(10) Patent No.: US 6,577,559 B1
(45) Date of Patent: Jun. 10, 2003

(54) ELECTRONIC CONVERTER FOR CONVERTING AN ACOUSTIC SIGNAL INTO A PSEUDO-DIGITAL SIGNAL, TIMEPIECE INCLUDING SUCH A CONVERTER AND TWO-DIRECTIONAL COMMUNICATION METHOD VIA ACOUSTIC WAVES

(75) Inventors: Emmanuel Fleury, Moutier (CH); Fabien Blondeau, Le Landeron (CH)

(73) Assignee: Eta SA Fabriques d'Ebauches, Grenchen (CH)

( * ) Notice: Subject to any disclaimer, the term of this patent is extended or adjusted under 35 U.S.C. 154(b) by 120 days.

(21) Appl. No.: 09/630,734

(22) Filed: Aug. 2, 2000

(30) Foreign Application Priority Data

Aug. 4, 1999 (CH) .................................................. 1433/99

(51) Int. Cl.$^7$ ........................ G04C 21/00; G04C 21/16; H01L 41/08
(52) U.S. Cl. ..................... 368/250; 368/255; 310/321; 310/322; 310/339
(58) Field of Search .................. 368/72–74, 250, 368/255; 310/321–322, 324, 338, 339

(56) References Cited

U.S. PATENT DOCUMENTS

| 3,846,779 A | * 11/1974 | Martner ................... 340/258 B |
| 3,989,963 A | * 11/1976 | Giaccardi ................... 310/8.1 |
| 4,232,241 A | 11/1980 | Hamatani |
| 4,242,745 A | 12/1980 | Mutrux |
| 4,353,004 A | * 10/1982 | Kleinschmidt ............... 310/318 |
| 4,670,864 A | * 6/1987 | Hoffman ..................... 367/198 |
| 4,761,582 A | * 8/1988 | McKee ........................ 310/322 |
| 5,719,825 A | 2/1998 | Dotter |
| 5,757,104 A | * 5/1998 | Getman et al. ............. 310/317 |

FOREIGN PATENT DOCUMENTS

| CH | 641 625 | 3/1984 |
| DE | 36 18 222 | 12/1987 |
| WO | WO95/22065 | 8/1995 |

\* cited by examiner

*Primary Examiner*—Vit Miska
(74) *Attorney, Agent, or Firm*—Griffin & Szipl, P.C.

(57) ABSTRACT

The present invention concerns the use of a sound generator circuit (22) including a piezoelectric vibrator ($P_3$) as an acoustic wave receiver.

The invention also concerns an electronic converter (20) including a sound generator circuit (22) provided with a piezoelectric vibrator ($P_3$) as well as means supplying a reference voltage, characterized in that it further includes comparison means which compare the reference voltage to the voltage generated by the piezoelectric vibrator ($P_3$) when the latter picks up an acoustic wave, said comparison means generating a pseudo-digital signal when the voltage generated by said vibrator ($P_3$) exceeds said reference voltage.

Finally the invention concerns a timepiece provided with a converter circuit (20) as described above, as well as a two-directional communication method via acoustic waves between an emitter unit and a receiver unit.

17 Claims, 7 Drawing Sheets

ART ANTERIEUR

ART ANTERIEUR

ART ANTERIEUR

ART ANTERIEUR

ART ANTERIEUR

ART ANTERIEUR

ELECTRONIC CONVERTER FOR CONVERTING AN ACOUSTIC SIGNAL INTO A PSEUDO-DIGITAL SIGNAL, TIMEPIECE INCLUDING SUCH A CONVERTER AND TWO-DIRECTIONAL COMMUNICATION METHOD VIA ACOUSTIC WAVES

The present invention concerns an electronic converter for converting an acoustic signal into a pseudo-digital signal, in particular for controlling a microprocessor, as well as a timepiece including such a converter. The invention also concerns a two-directional communication method via acoustic waves between a transmitter unit and a receiver unit.

A system for processing personal data is known from U.S. Pat. No. 5,848,027 in the name of Biometrics, Inc. This system allows, for example, the performance of an athlete, such as a runner, to be monitored. It allows to record the date and time of the time for each lap or even the final time achieved by the athlete. The system also allows the values of certain physiological parameters to be stored such as the cardiac rhythm or an electrocardiogram (ECG) which reflect the effort made by the athlete during his sporting activity. All this information will then be transmitted, via an acoustic link, to a personal computer in which the information will be processed, analysed and finally displayed on the screen of said computer.

FIG. 1 annexed to the present Patent Application shows a preferred embodiment of the aforementioned Biometric system. This system includes a portable object such as a timepiece 1, for example a digital display wristwatch, able to store data and subsequently transmit them. These data may be transmitted to a personal computer 2 in the form of acoustic "beeps" generating an acoustic pressure 4 which will be picked up by a microphone 6. The timepiece may be any type of digital instrument controlled by a microprocessor and containing a piezoelectric element able to generate acoustic "beeps" for data transmission. Personal computer 2 is fitted with a sound card 8 connected to microphone 6 by a cable 10. The computer is thus able to pick up acoustic pressure 4 generated by the acoustic "beeps" emitted by timepiece 1. Said computer 2 may also be fitted with a display screen 2.

As shown in FIG. 2 of the present Application, timepiece 1 includes an internal microprocessor 14 which provides the timebase to said timepiece 1. Microprocessor 14 may also control a storage programme 16 co-operating with an internal random access memory. Further, a piezoelectric element 18 is able to generate at its output a pre-selected tonality. Piezoelectric element 18 is thus used to generate the acoustic "beeps" similar to those generated by sound generator devices in most digital watches fitted with an alarm.

The Biometrics system described above advantageously allows personal data to be stored in a watch, then these data to be transferred by sound waves to a computer where they will be processed and analysed. This system is unfortunately not two-directional. It is thus not possible to transfer data from the computer to the watch, which considerably limits the possible applications of the Biometrics system.

Moreover, Swiss Patent No. 641 625 in the name of Seikosha, Tokyo (JP) is also known, which discloses an electric circuit for driving a piezoelectric vibrator.

FIGS. 3 and 4 annexed to the present Patent Application show, respectively by an electric diagram and by diagrams of the evolution of voltage levels as a function of time, the constitution and operating mode of a conventional drive circuit for a piezoelectric vibrator.

The electric circuit whose diagram is shown in FIG. 3 includes a coil $L_1$, connected to the output of a transistor $T_{R1}$ which is alternately "ON" and "OFF". A piezoelectric vibrator $P_1$ is connected in parallel across coil $L_1$. This electric circuit receives, on a connection input "a", a square pulsed control signal corresponding to what is shown by curve A of FIG. 4 whose abscissa represents the time "t" and whose ordinate represents the voltage "v". From input terminal "a", this signal is applied to the base of transistor $T_{R1}$ via a resistor R. When transistor $T_{R1}$ is kept "ON" by the control signal pulse, an electric current flows through coil $L_1$ from a direct-current voltage source +E while connection "b" of piezoelectric vibrator $L_1$ is connected to the electric circuit's earth in accordance with what is shown by curve B of FIG. 4 (whose abscissa represents time "t" and whose ordinate represents voltage "v").

It is to be noted that as long as transistor $T_{R1}$ is "ON", no current flows through piezoelectric vibrator $P_1$. The latter behaves in fact like a capacitor. The current "i" supplied by a capacitor is equal to the product C*dE/dt, where C is the capacitance value of the capacitor, and E the voltage across its terminals. In the present case, since E is a direct-current voltage, its derivate with respect to time is zero, and the current which flows in piezoelectric vibrator $P_1$ is also zero. It may also be noted that voltage "v" across the terminals of coil $L_1$ is given by the equation v=–L*di/dt=E, where L is the inductance value of said coil $L_1$, and "i" is the current which flows through it. Consequently, the product L*di/dt is constant, which means that as long as transistor $T_{R1}$ is kept "ON", the current which flows in coil $L_1$ increases linearly.

At the moment that transistor $T_{R1}$ passes in the "OFF" state at the trailing edge of each pulse of wave shape A, any accumulated energy in the coil is transmitted to the terminals of the piezoelectric vibrator, charging the latter at a much higher voltage than the supply voltage, and in the opposite direction. As can be seen on the wave shape B of FIG. 4, this oscillating voltage has a first positive pulse of great amplitude, followed by a second very damped out negative pulse. This great damping out is due to the fact that the voltage at connection point "b" which is connected to the collector of transistor $T_{R1}$ cannot exceed, during the negative alternance, the blocking voltage of the P-N diode which forms this collector, a blocking voltage whose value is usually of the order of 0.6 volts. Thus the efficient electric energy which makes piezoelectric vibrator $P_1$ operate is only given by the initial pulse which is of short duration, so that it is difficult to obtain high excitation of said vibrator $P_1$. It is for this reason that one encounters the drawback of not being able to obtain a sufficiently high sound pressure level.

FIGS. 5 and 6 annexed to the present Patent Application show the solution provided by Seikosha to the aforementioned problem. FIG. 5 is a diagram representing an electric drive circuit for a piezoelectric vibrator constituting an embodiment of the Seikosha invention. FIG. 6 is a diagram of the voltage levels as a function of time at two locations of the circuit of FIG. 5.

The electric circuit whose diagram is shown in FIG. 5 includes a coil $L_2$ and a diode D connected in series across the output of a transistor $T_{R2}$. A piezoelectric vibrator $P_2$ is connected in parallel across this series connection.

At the moment when transistor $T_{R2}$ passes to the "OFF" state at the trailing edge of each pulse of the square control signal (curve A, FIG. 6), a voltage is induced in coil $L_2$ and is applied, via diode D which remains polarised in the conductive direction, to the terminals of piezoelectric vibrator $P_2$ (curve B, FIG. 6). The voltage across the terminals of vibrator $P_2$ then remains blocked at its maximum level, since, at the beginning of the reverse voltage pulse in coil $L_2$, diode D is polarised in the non conductive direction and blocks the return of the current. As can be seen by comparing voltage levels B of FIGS. 4 and 6, the energy which is provided to piezoelectric vibrator $P_2$ is much greater than that which was provided to piezoelectric vibrator $P_1$ of the prior art.

Consequently, the Seikosha invention allows a substantial increase in the acoustic pressure level. However, this invention does not suggest the use of a piezoelectric vibrator for receiving and digitising of sound wave trains.

The object of the present invention is to overcome the above problems and drawbacks as well as others by providing an electronic converter for converting an acoustic signal into a pseudo-digital signal for operating a drive circuit for a piezoelectric vibrator in the manner of an acoustic wave sensor, and converting these wave trains into digital pulses.

According to a first aspect, the present invention therefore concerns the use of a sound generator circuit including a piezoelectric vibrator as an acoustic wave receiver.

According to a complementary feature of the invention, the sound generator circuit includes switching means arranged to be switched on and off upon receiving a control signal, as well as a circuit branch wherein a coil and a diode are mounted in series, a resistor and a piezoelectric vibrator being connected in parallel across said circuit branch.

As a result of these features, it is possible to use as acoustic wave receiver an electric circuit, which, originally, was solely designed to drive a piezoelectric vibrator used as a sound generator in electronic watches fitted with an alarm device. This object is achieved without it being necessary to modify the vibrator drive circuit, which means that substantial savings can be made in terms of manufacturing costs, and that a reliable, compact circuit can be provided.

According to a second aspect, the present invention concerns an electronic converter for converting an acoustic signal into a pseudo-digital signal, said electronic converter including a sound generator circuit provided with a piezoelectric vibrator as well as means supplying a reference voltage, characterised in that it further includes comparison means which compare the reference voltage to the voltage generated by the piezoelectric vibrator when the latter picks up an acoustic wave, said comparison means generating a pseudo-digital signal when the voltage generated by said vibrator exceeds said reference voltage.

As a result of these other features, one can not only generate a sound, but also pick up this sound and convert it into a logic voltage able to be used to control a microprocessor. It therefore becomes possible to envisage exchanging all types of data by acoustic waves between two distant objects, such as for example, two wristwatches or a wristwatch and a computer, using only the addition of a comparator circuit to the piezoelectric vibrator drive circuit. A two-directional communication system via acoustic waves is thereby obtained which is much simpler and much more compact than the wireless communication systems, for example via infrared or radio-frequency, which are currently known.

The present invention also concerns a timepiece including a converter circuit as described above.

The present invention finally concerns a two-directional communication method via acoustic waves between an emitter unit and a receiver unit, each of these two units including a microprocessor and an electronic converter, said converter including a sound generator circuit provided with a piezoelectric vibrator as well as means supplying a reference voltage, the method being characterised in that:

the sound generator circuit includes switching means arranged to be switched on and off on receiving a pulsed control signal;

the electronic converter also includes comparison means which compare the reference voltage to a voltage generated by the piezoelectric vibrator when the latter picks up an acoustic wave, these comparison means generating a pseudo-digital signal formed of a succession of logic pulses when the voltage generated by said vibrator exceeds the reference voltage;

as long as the emitter and receiver are idle, the microprocessor of the receiver waits for a sound signal;

as soon as the emitter sends the first of a series of successive acoustic "beeps", the microprocessor of the receiver instructs a time counter to start and begins to count the number of logic pulses generated by the comparison means, so that said microprocessor can calculate the number of pulses received in a given time interval, and determine by reading in a counter whether the logic level is "0" or "1".

According to a complementary feature of the invention, the method is characterised in that each "0" or "1" logic level corresponds to a long "beep" or a short "beep", two successive acoustic "beeps" being separated by a silent period during which the emitter does not emit.

Other features and advantages of the present invention will appear more clearly upon reading the following detailed description of an embodiment example of the electronic converter according to the invention, this example being given purely by way of non-limiting illustration, in conjunction with the annexed drawings, in which:

FIG. 1 which has already been cited, shows a timepiece able to store personal data, then transmit these data to a computer via a sound link;

FIG. 2 which has already been cited, is a block diagram of a timepiece as shown in FIG. 1, including a data processing programme, as well as means for storing and transmitting said data;

FIGS. 3 and 4, which have already been cited, show respectively via an electric diagram and via voltage level evolution diagrams as a function of time, the constitution and operation mode of a first embodiment of a drive circuit for a piezoelectric vibrator;

FIG. 5, which has already been cited, shows the diagram of a second embodiment of a drive circuit for a piezoelectric vibrator;

FIG. 6, which has already been cited, is a voltage level diagram as a function of time at two locations of the circuit of FIG. 5;

Figure 13A:
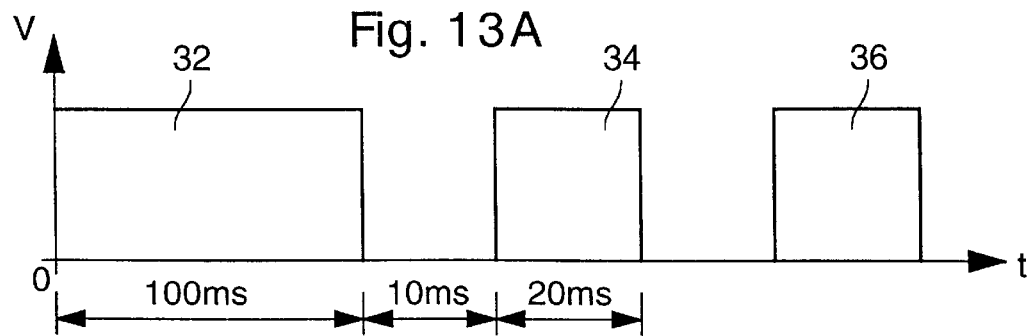
Figure 13B:
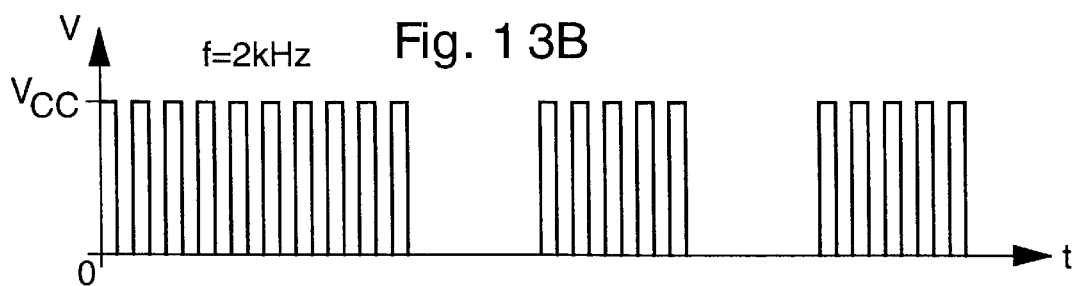
Figure 14:
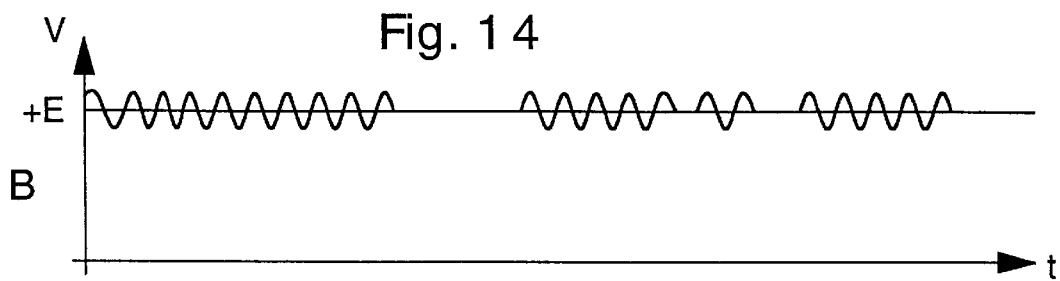
Figure 15:
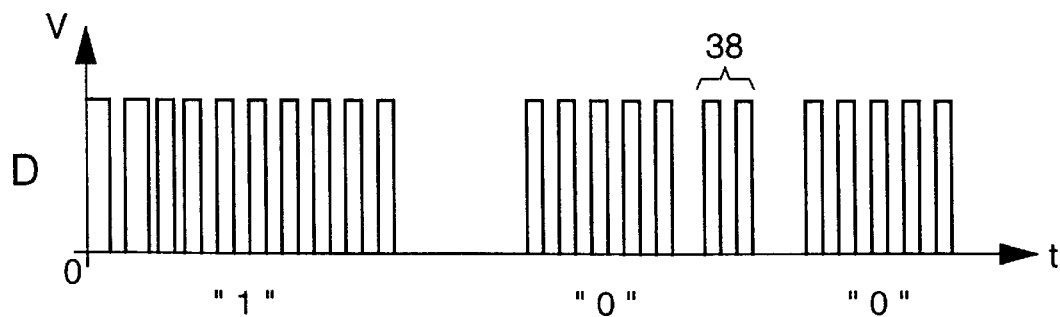
Figure 15:
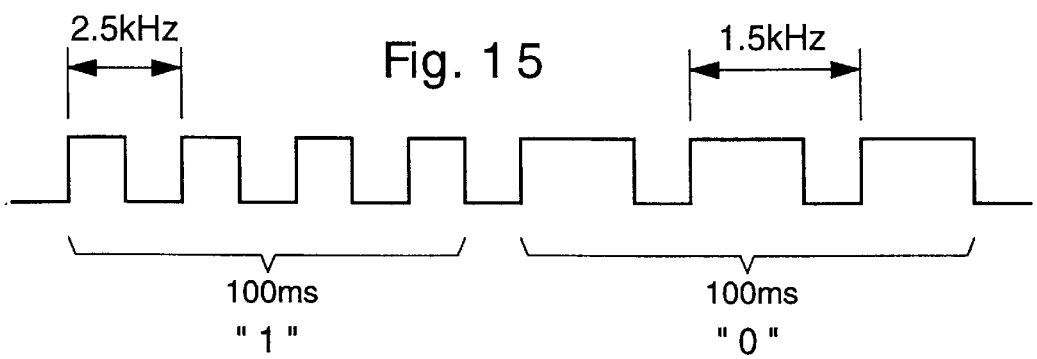

FIGS. 13A and 13B respectively show the envelope of the sound signal emitted by an emitter watch, as well as the square pulsed control voltage applied to the switching transistor of said watch;

FIG. 14 shows the voltage levels at the connection point of the piezoelectric vibrator and at the output of the analogue-digital converter in the receiver watch; and FIG. 15 is a graphic diagram of the FSK modulation coding principle.

The present invention proceeds from the general inventive idea which consists in using a piezoelectric vibrator, usually used as a sound generator in electronic watches including an alarm device, as an acoustic wave receiver. The invention also consists in connecting said piezoelectric vibrator to the terminals of an electronic comparator which generates at its output a pseudo-digital signal representative of the incident sound signal picked up by the vibrator and allowing, for example, the functions of a microprocessor to be controlled.

Figure 1:
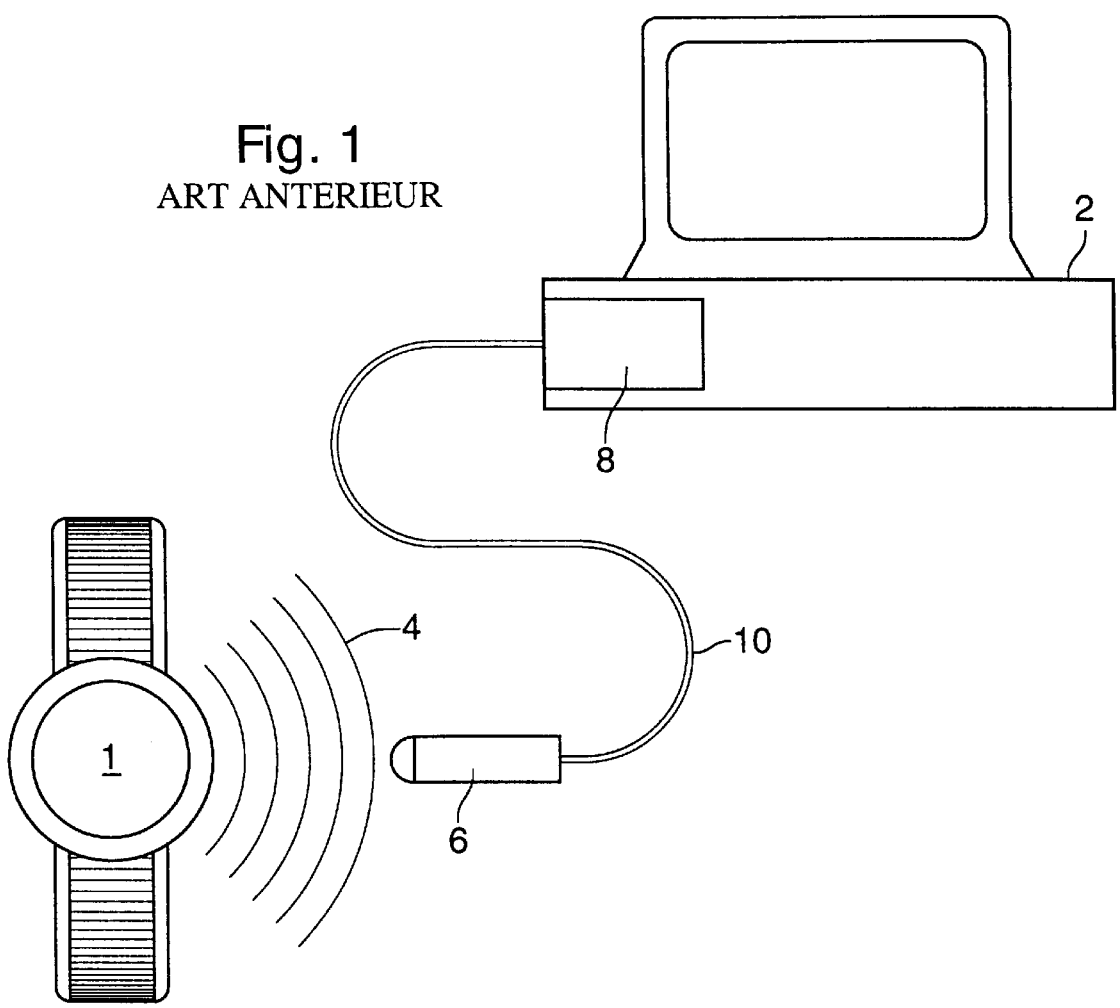
Figure 2:
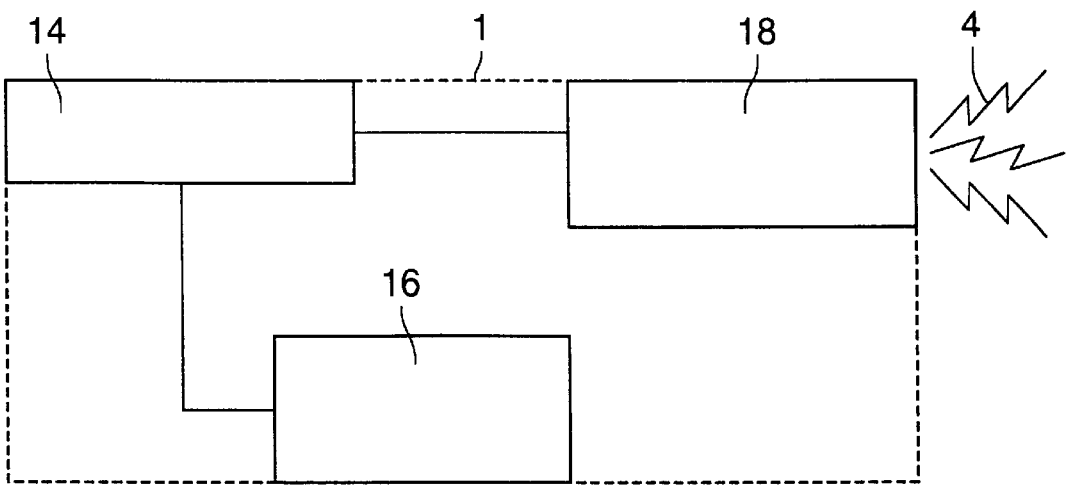
Figure 3:
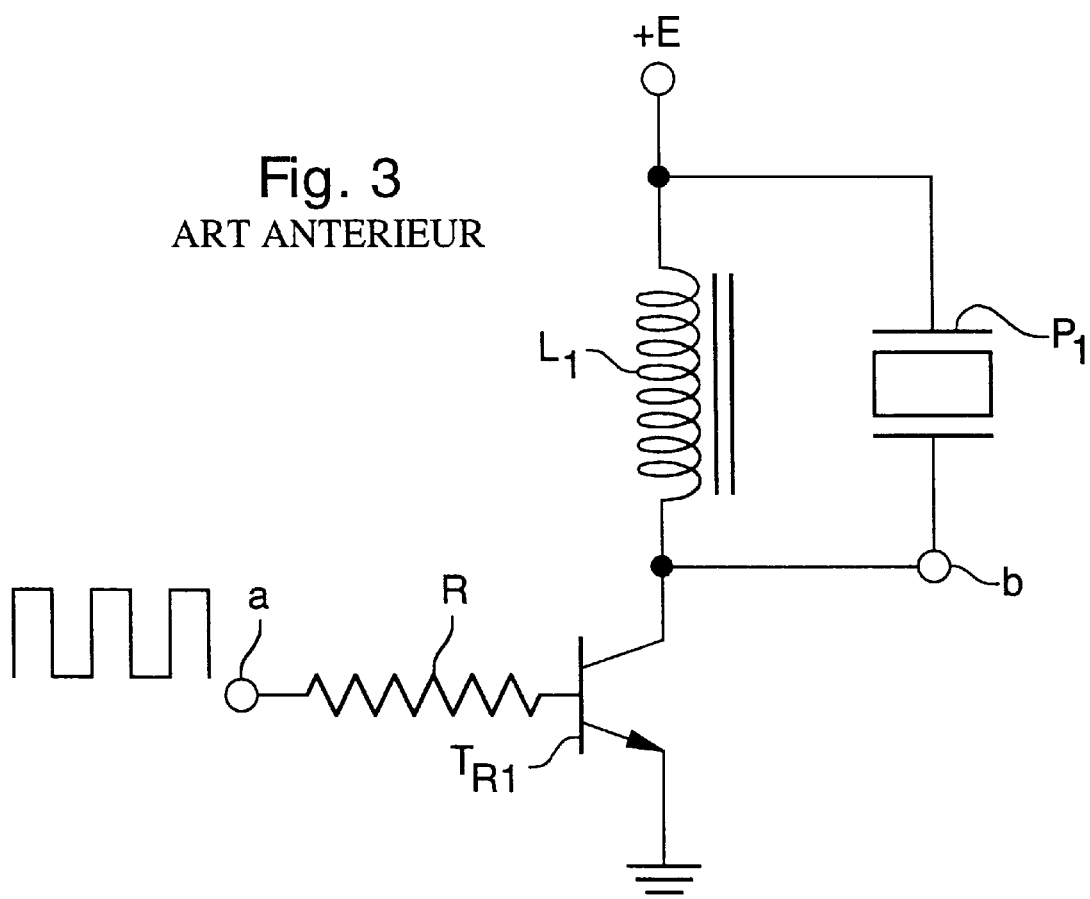
Figure 4:
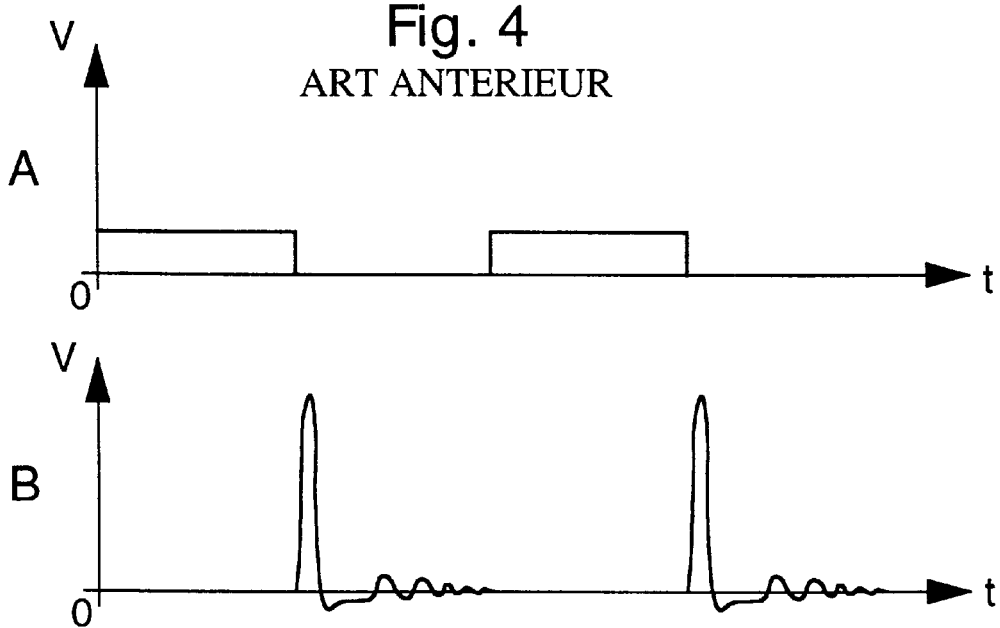
Figure 5:
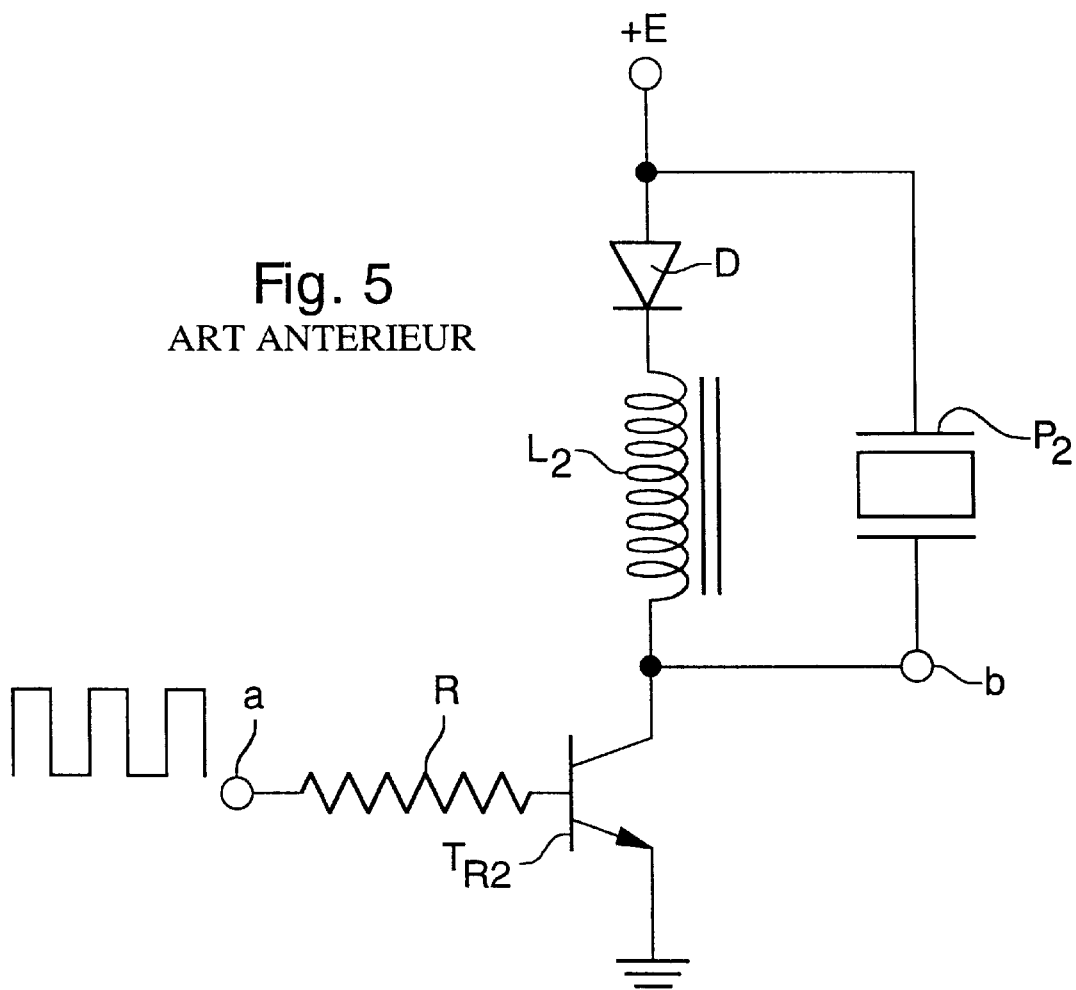
Figure 6:
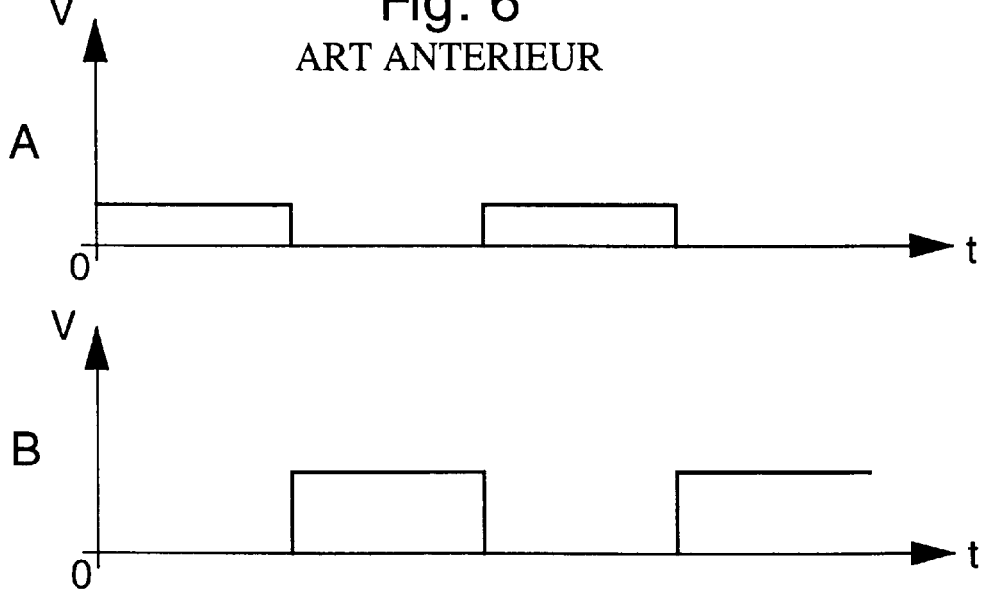
Figure 7:
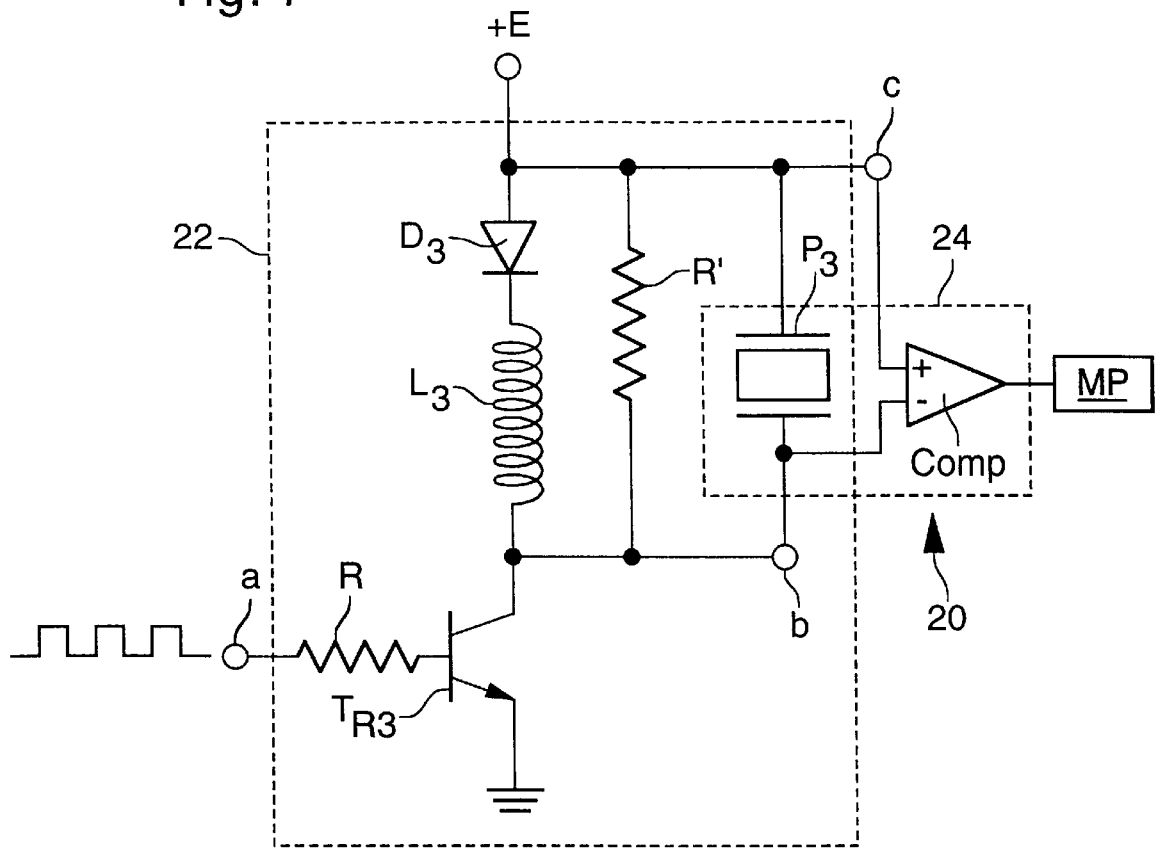
FIG. 7 shows an electric diagram of a circuit for converting an acoustic signal into a pseudo-digital signal according to the present invention.

FIG. 7 shows the electronic converter according to the present invention designated as a whole by the general numerical reference 20. As is clear from FIG. 7, aforementioned electronic converter 20 is formed by the association of a drive circuit 22 for a piezoelectric vibrator $P_3$ and a comparison circuit 24 the respective operating principles of which will be described hereinafter.

Drive circuit 22 for piezoelectric vibrator $P_3$ includes a circuit branch in which a coil $L_3$ and a diode $D_3$ are mounted in series, a resistor R' and piezoelectric vibrator $P_3$ being connected in parallel across this circuit branch.

Figure 8:
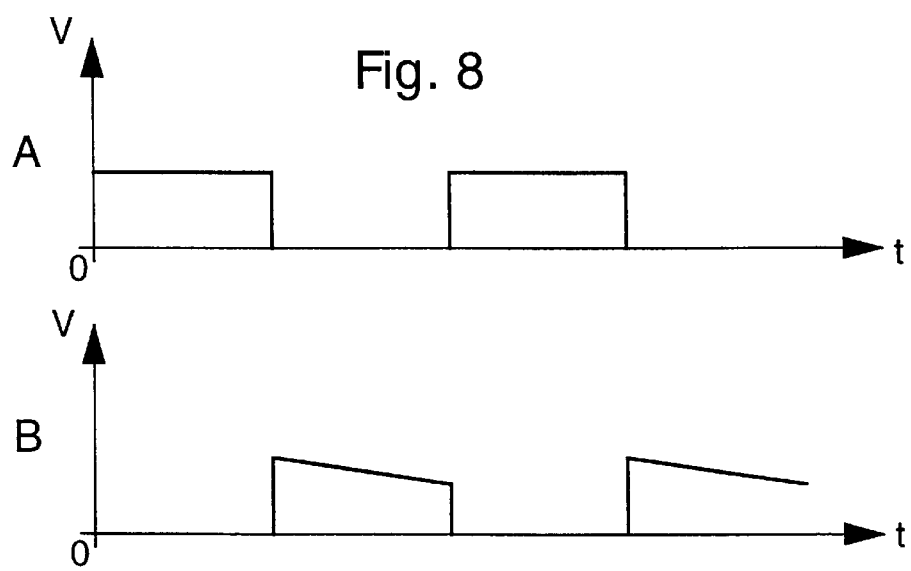
FIG. 8 shows the voltage levels as a function of time at two locations of the circuit of FIG. 7.

Since the operating mode of drive circuit 22 was already analysed in detail in the background section of the present Patent Application dedicated to the state of the art, only the main features thereof will be briefly recalled here. Drive circuit 22 receives on an input terminal "a" a square pulsed control signal "v" (curve A, FIG. 8). This control signal is applied through a resistor R to the base of a transistor $T_{R3}$. When transistor $T_{R3}$ is switched "ON" by a control pulse, a current, supplied by a direct-current voltage source +E flows through coil L3, while the connection point "b" of piezoelectric vibrator $P_3$ is connected to the earth of drive circuit 22. When transistor $T_{R3}$ passes to the "OFF" state on the trailing edge of each control pulse, all the energy accumulated in coil $L_3$ is transmitted to the terminals of vibrator $P_3$, charging the latter at a voltage "v" (curve B, FIG. 8) higher than supply voltage +E. When, in turn, vibrator $P_3$ begins to discharge, diode $D_3$ blocks the return of the current. The energy which is supplied to said vibrator $P_3$ is thus very large. It will be noted that between two successive pulsed control signals, piezoelectric vibrator $P_3$ may however be partially discharged through resistor R'. Thus, when there is no longer a control signal applied to transistor $T_{R3}$, and the latter is thus in the "OFF" state, the voltage across the terminals of vibrator $P_3$ gradually regains its idle value +E.

Figure 9:
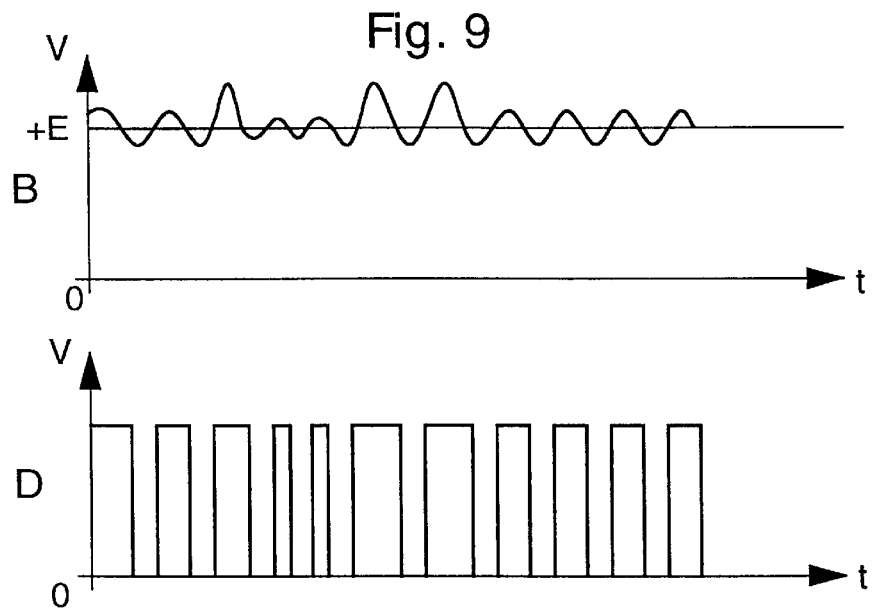
FIG. 9 shows the voltage levels as a function of time at two locations of the circuit of FIG. 7 when this circuit is used as a sound wave receiver.

The operation of comparison circuit 24 will now be examined. This includes means formed, in the example shown in FIG. 7, by an analogue-digital comparator COMP. One of the inputs of comparator COMP is connected to means supplying a reference voltage. By way of non-limiting example, the first input of comparator COMP is connected to the connection point "c" of the source of direct-current supply voltage +E, while the other input of said comparator COMP is connected to the output point "b" of drive circuit 22, in other words to the point of connection between piezoelectric vibrator $P_3$ and transistor $T_{R3}$. As already specified above, in the absence of any control signal applied on the base of transistor $T_{R3}$, vibrator $P_3$ is idle and the voltage across its terminals is equal to supply voltage +E (curve B, FIG. 9). In these conditions, and according to a first aspect of the invention, piezoelectric vibrator $P_3$ is no longer used as a sound generator but may, however, be used as acoustic wave receiver. Under the effect of an incident sound signal, the voltage across the terminals of vibrator $P_3$ will start to oscillate either side of its idle voltage +E, as shown by curve B of FIG. 9. It will be understood that the energy generated in piezoelectric vibrator $P_3$ by an incident acoustic wave could be capable of dissipating in coil $L_3$, so that it would no longer be available across the terminals of said vibrator $P_3$, which would lead to a low voltage level at connection point "b" with comparator COMP, and thus to a higher sensitivity to noise. However, diode $D_3$ mounted in series with coil $L_3$ has the advantage of having a very high impedance, which is equivalent to an open circuit, and thus prevents vibrator $P_3$ from discharging. Comparator COMP then compares the voltage generated by said vibrator $P_3$ with its reference voltage, which is supply voltage +E of drive circuit 22. Each time that the voltage generated by piezoelectric vibrator $P_3$ exceeds voltage +E, comparator COMP will generate a pulsed signal at its output "d" (curve D, FIG. 9). It is thus possible, as a result of the present invention, to convert an acoustic signal into a pseudo-digital signal, by using a conventional drive circuit for a piezoelectric vibrator, and by simply connecting an analogue-digital converter to the terminals of said circuit. The pseudo-digital signal will then be used to control a microprocessor MP as will be described in detail hereinafter. It should be noted that, as shown by curve D of FIG. 9, comparator COMP has an output potential which varies between its positive supply voltage +E, and its negative supply voltage, i.e. the earth of converter circuit 20 according to the invention.

Figure 10:
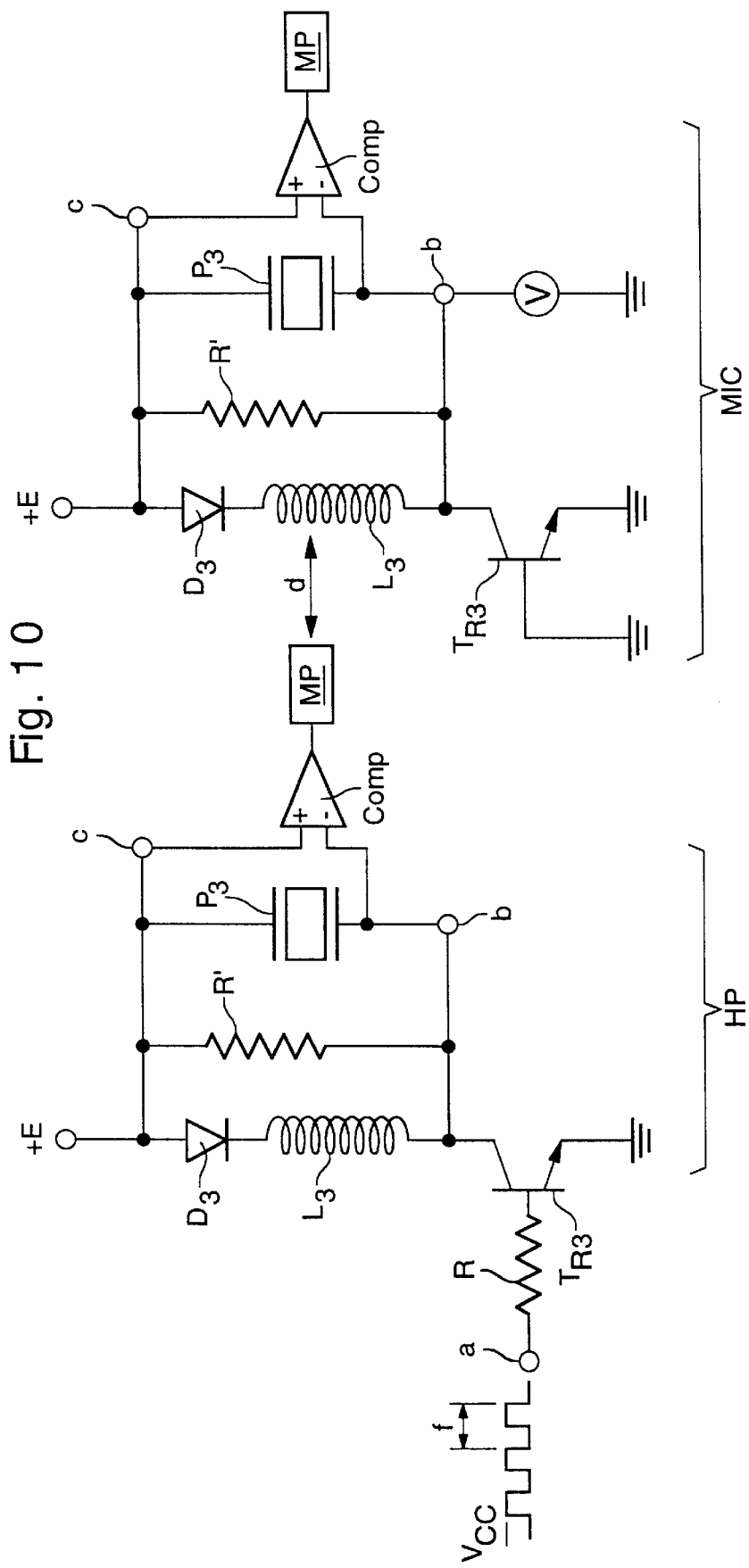
FIG. 10 shows an electric diagram of two converter circuits according to the present invention, arranged side by side in order to determine the frequency transfer function of the acoustic system formed by these two converters.

FIG. 10 shows two identical converter circuits 20 arranged at a distance "d" from each other. One of these converter circuits 20 operates as a sound generator (it will also be said that it operates in loud-speaker mode HP), while the other converter circuit 20 operates as a sound receiver (it will also be said that it operates in microphone mode MIC). A square pulsed control signal $V_{cc}$ is applied to the base of transistor $T_{R3}$ of converter circuit HP. Converter circuit MIC must be totally passive. Transistor $T_{R3}$ of circuit MIC must thus be in the "OFF" state, i.e. there must be no voltage applied on its base. It will easily be understood that by varying the frequency "f" of control signal $V_{cc}$ applied to transistor $T_{R3}$ of circuit HP, the frequency of the sound generated by the circuit is made to vary. At the same time, the response of piezoelectric vibrator $P_3$ of circuit MIC to the sound signal generated by circuit HP is measured by means of a voltmeter V. One thus obtains (see FIG. 11) the frequency-transfer characteristic of the two converter circuits according to the invention, one of which emits a sound signal (converter circuit HP), and the other one of which receives this sound signal (converter circuit MIC), for a given distance "d" and control voltage $V_{cc}$. It should be noted that the measurement thereby obtained takes account, not only of the transfer characteristic of circuit MIC (which may be obtained during a measurement of the frequency response thereof), but also of the transfer characteristic of circuit HP and its amplifier formed of the elements diode $D_3$, transistor $T_{R3}$ and coil $L_3$. It should also be noted that the transfer characteristic largely depends upon the features of the piezoelectric vibrators used in circuits MIC and HP.

Figure 11:
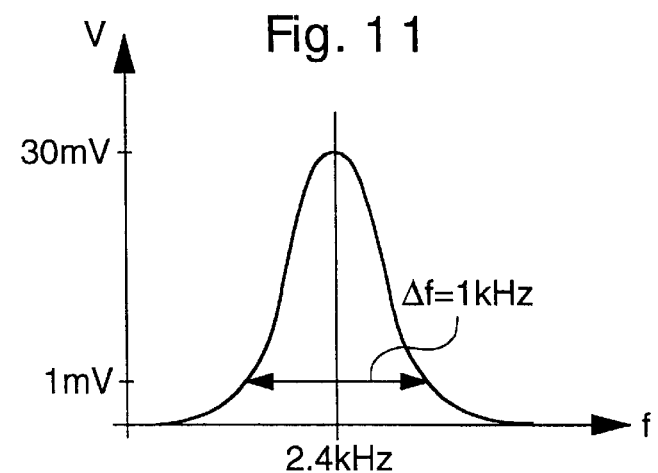
FIG. 11 is a graphic diagram of the frequency transfer function of the system of FIG. 10.

As can be seen upon examining FIG. 11, the system response formed of the two circuits HP and MIC is optimum for a frequency f of approximately 2.4 kHz of control signal $V_{cc}$ applied to transistor $T_{R3}$ of circuit HP. At this frequency, the voltage generated by piezoelectric vibrator $P_3$ of circuit MIC at its connection point "b" is of the order of 30 mV. It will be noted, on the other hand, that the transmission bandwidth of the system HP/MIC for a voltage of 1 mV is of the order of $\Delta f=1$ kHz. These results are obtained with the following values for the different parameters:

distance "d" between the two circuits HP and MIC close to zero;

control voltage $V_{cc}=3$ V;

capacitance of piezoelectric vibrators $P_3$ of the order of 10 nF, and inductance of coils $L_3$ of the order of 50 mH.

Figure 12:
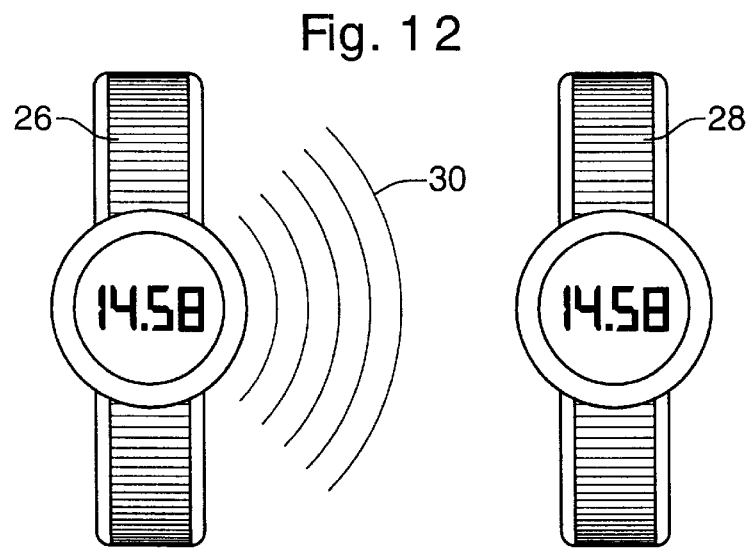
FIG. 12 is a schematic diagram of two electronic wristwatches which exchange data with each other via sound waves.

FIG. 12 shows schematically two electronic wristwatches 26 and 28 each fitted with a converter circuit 20 according to the present invention, any one of these two watches 26 or 28 being able to pick up acoustic pressure 30 generated by the sound "beeps" originating from the other watch. It goes without saying that the example of two wristwatches is given solely by way of illustration, and that it could be any type of digital instrument controlled by a microprocessor and containing a piezoelectric element able to generate and pick up sounds.

Let us assume, for example, that watch 26 operates as a sound generator and generates (see FIG. 13A) a train of acoustic waves including a long "beep" 32 followed by two short "beeps" 34 and 36. In order to generate this acoustic wave train, a square pulsed control signal as shown in FIG. 13B must be applied to the base of transistor $T_{R3}$ of emitter watch 26.

The frequency of the pulsed control signal is for example selected to be equal to 2 kHz, i.e. a value close to the optimum frequency determined by the transfer characteristic of the two emitter and receiver watches 26 and 28. The pulsed control signal is applied to transistor $T_{R3}$ of emitter watch 26 by microprocessor MP of the latter. Emitter watch 26 includes a time base provided by a quartz oscillator (not shown) which oscillates typically at the frequency of 32 kHz. In order to obtain the desired frequency of 2 kHz, a division chain can be used which will divide the oscillation frequency of the quartz oscillator by sixteen. Microprocessor MP of emitter watch 26 may also be programmed so that, each time that said microprocessor MP counts sixteen pulses provided by the quartz oscillator, it will command the polarity of the control signal applied to the base of transistor $T_{R3}$ of said emitter watch 26 to be inverted.

The response of converter circuit 20 of receiver watch 28 is shown in FIG. 14. It can be seen that, under the effect of the acoustic wave train generated by emitter watch 26, the voltage at connection point "b" of piezoelectric vibrator $P_3$ of receiver watch 28 begins to oscillate on either side of its supply voltage +E (curve B, FIG. 14). As already explained hereinbefore, each time that the voltage generated by piezoelectric vibrator $P_3$ exceeds its idle voltage +E, comparator COMP of receiver watch 28 will generate a pulsed signal at its output "d" (curve D, FIG. 14). The acoustic wave generated by emitter watch 28 is thus converted into a pseudo-digital signal able to control microprocessor MP of receiver watch 28 as will be explained hereinafter. It will be noted that the pulsed signal generated by comparator COMP of receiver watch 28 has a similar shape to that of the pulsed control signal applied to transistor $T_{R3}$ of emitter watch 26, except for the parasitic peaks designated by the reference 38 which may appear between two successive sound "beeps" under the effect of ambient noise picked up by piezoelectric vibrator $P_3$ of said receiver watch 28.

As long as the emitter watch 26/receiver watch 28 system is idle, microprocessor MP of receiver watch 28 remains on standby. As soon as emitter watch 26 sends a first "beep" sound, microprocessor MP of receiver watch 28 instructs a time counter to start. At the same time, it counts the number of logic pulses generated by comparator COMP and determines, by reading in a counter, whether it is a "0" or "1" logic level.

Purely by way of example, let us assume that the duration of a long "beep" sound will be 100 ms, while the duration of a short "beep" sound will be 20 ms. Since the frequency of the pulsed control signal from transistor $T_{R3}$ of emitter watch 26 is 2 kHz, comparator COMP of receiver watch 28 will generate 200 pulses in response to a long "beep" sound, and 40 pulses in response to a short "beep" sound. Still by way of example only, let us assume that a long "beep" corresponds to a "1" logic, while a short "beep" corresponds to a "0" logic. It will be noted that the parasitic signals present at each transition from "0" to "1" or from "1" to "0" at the output of comparator COMP of receiver watch 28 must be filtered at the input of microprocessor MP, for example by means of a digital filter. Thus, after the first twenty milliseconds, microprocessor MP of receiver watch 28 will have counted forty pulses. A so called "silent" period is thus defined, whose duration may be, for example, 10 ms. This silent period allows logic levels "0" and "1" sent successively to microprocessor MP to be distinctly separated, and corresponds to a period of time during which emitter watch 26 does not sent any "beep" sounds. Microprocessor MP of receiver watch 28 thus no longer records any pulses, or only a random number of pulses due only to the ambient noise picked up by piezoelectric vibrator P3 of receiver watch 28. Consequently, if after the first twenty milliseconds during which forty pulses have been sent, there follows a silent period of 10 ms, microprocessor MP of receiver watch 28 will deduce that it is a "0" logic. Conversely, if during the following 20 milliseconds, microprocessor MP receives forty additional pulses, it will deduce that it is not a "0" logic, and will remain on standby for the following pulses necessary to form a "1" logic. It will be noted that a certain tolerance threshold may be accepted in the transmission of the pulses to microprocessor MP. For example, 200 pulses plus or minus 10 pulses transmitted over 100 ms, followed by 10 ms of silence correspond to a "1" logic.

In the example described above, the duration of a long "beep" is 100 ms, that of a short "beep" is 20 ms, and the duration of a silent period separating two successive "beeps" is 10 ms. A simple statistical analysis allows one to deduce that the data flow rate between emitter watch 26 and receiver watch 28 will be of the order of approximately 10 bits/ second. It will be understood, of course, that for different "beep" sound durations, transmission flow rates much greater than 10 bits/second may be obtained.

As was seen in the foregoing, it is possible, as a result of the present invention, to convert "beep" sounds generated by a first object, into "0" and "1" logic levels able to control the microprocessor of a second object placed at a distance from the first. This data transfer may occur between two electronic watches, for example, or even between a watch and a computer. An application example of such a system relates to the time-setting of a watch. The wearer of the watch connects himself to the Internet site of the manufacturer of said watch and activates the time-setting function offered by this site. The computer, fitted with a sound card, will then emit a succession of "beeps" which correspond to as many "0" and "1" logic levels as can be understood by the microprocessor fitted to the watch and which enable the latter to command the time-setting of the watch. Conversely, one may envisage transferring data from the watch to the computer. It may be a code kept in the watch memory and allowing free participation in a lucky draw accompanied by prizes organised on the Internet site of the watch manufacturer. Any type of personal or other data may also be exchanged between two watches.

Finally, a second mode of converting a sound signal into pseudo-digital data able to control the functions of a microprocessor will be described, again by way of example. It concerns frequency shift keying ("FSK") coding, shown in FIG. 15. In this case, the duration of a sound pulse is fixed, for example equal to 100 ms, and it is the frequency of the control signal applied to the base of transistor $T_{R3}$ of emitter watch 26 which varies. For example, a frequency of 1.5 kHz will correspond to a "0" logic, while a frequency of 2.5 kHz will correspond to a "1" logic. Microprocessor MP of receiver watch 28 will thus count the number of pulses received every 100 ms, and will deduce whether it is a "0" or a "1" logic. One of the advantages of frequency shift keying coding is that two successive bits of data are not separated by any silent period.

It goes without saying that the invention is not limited to the embodiment which has just been described, and that modifications and variants may be envisaged without departing from the scope of the invention.

What is claimed is:

1. A sound generator circuit including a piezoelectric vibrator which generates a sound in response to an electric signal, and which also generates an electric signal in response to an acoustic wave, the generator circuit further comprising means for preventing the piezoelectric vibrator from discharging.

2. The sound generator circuit according to claim 1, comprising switching means arranged to be switched on and off upon receiving a control signal, as well as a circuit branch in which a coil and a diode are mounted in series, a resistor and the piezoelectric vibrator being connected in parallel across said circuit branch.

3. The sound generator according to claim 2, wherein the switching means include a transistor.

4. An electronic converter including a sound generator circuit provided with a piezoelectric vibrator as well as means supplying a reference voltage, wherein the electronic converter further includes driving means which prevent the piezoelectric vibrator from discharging, and comparison means which compare the reference voltage to the voltage generated by the piezoelectric vibrator when the latter picks up an acoustic wave, said comparison means generating a pseudo-digital signal when the voltage generated by said vibrator exceeds said reference voltage.

5. A converter according to claim 4, wherein the reference voltage is the supply voltage which allows a current to flow in the sound generator circuit.

6. A converter according to claim 4, wherein the comparison means include an analogue-digital comparator.

7. A converter according to claim 4, wherein the pseudo-digital signal generated by the comparison means is used to control the functions of a microprocessor.

8. A converter according to claim 4, wherein the sound generator circuit includes switching means arranged to be switched on and off upon receiving a control signal, as well as a circuit branch in which a coil and a diode are mounted in series, a resistor and the piezoelectric vibrator being connected in parallel across said circuit branch.

9. A converter according to claim 8, wherein the switching means include a transistor.

10. A converter according to claim 8, wherein the control voltage is equal to 3 V, in that the capacitance of the piezoelectric vibrators is of the order of 10 nF, and in that the inductance of the coils is of the order of 50 mH.

11. A converter according to claim 10, wherein the frequency-transfer characteristic of said converter is centred on a frequency of 2.4 kHz, and in that the transmission bandwidth of said transfer characteristic is of the order of 1 kHz.

12. Timepiece comprising an electronic converter including a sound generator circuit provided with a piezoelectric vibrator as well as means supplying a reference voltage, wherein the electronic converter further includes driving means which prevent the piezoelectric vibrator from discharging, and comparison means which compare the reference voltage to the voltage generated by the piezoelectric vibrator when the latter picks up an acoustic wave, said comparison means generating a pseudo-digital signal when the voltage generated by said vibrator exceeds said reference voltage.

13. Two-directional communication method via acoustic waves between an emitter unit and a receiver unit, each of these two units including a microprocessor and an electronic converter, wherein each electronic converter includes a sound generator circuit provided with a piezoelectric vibrator as well as means for supplying a reference voltage, the method comprising the steps of:

providing an emitter unit and a receiver unit, wherein each unit includes a microprocessor and an electronic converter, wherein each electronic converter includes a sound generator circuit provided with a piezoelectric vibrator as well as means for supplying a reference voltage;

providing a pulsed control signal to the sound generator circuit of the emitter unit so that the pulsed control signal switches on and off a switching means of the sound generator circuit of the emitter unit;

supplying a reference voltage to the electronic converter of the receiver unit by using the means for supplying a reference voltage for said receiver unit;

comparing, by using a comparison means of the corresponding electronic converter, the reference voltage to a voltage generated by the corresponding piezoelectric vibrator when the latter picks up an acoustic wave, wherein the comparison means generates a pseudo-digital signal formed of a succession of logic pulses when the voltage generated by the piezoelectric vibrator exceeds the reference voltage; and when the sound generator circuit of the emitter unit sends a first of a series of successive acoustic "beeps" instructing the microprocessor of the receiver unit to start a time counter for counting the number of logic pulses generated by the comparison means of the receiver unit, so that the receiver unit microprocessor calculates the number of logic pulses received in a given time interval, and determines, by reading in a counter, whether the logic level is "0" or "1".

14. Method according to claim 13, wherein each "0" or "1" logic level corresponds to a long "beep" or a short "beep", two successive acoustic "beeps" being separated by a silent period during which the emitter unit does not emit.

15. Method according to claim 14, wherein the frequency of the pulsed control signal provided to the switching means of the emitter unit is 2 kHz, in that the duration of a short "beep" is 20 ms and the duration of a long "beep" is 100 ms, and in that the duration of the silent period separating two successive "beeps" is 10 ms.

16. Method according to claim 13, wherein frequency shift keying "FSK" coding is used by the microprocessor to calculates the number of logic pulses received in a given time interval determine, by reading in the counter, whether the logic level is "0" or "1".

17. Method according to claim 16, wherein the duration of the acoustic "beeps" emitted by the emitter is 100 ms, and in that the frequency of the pulsed control signal provided to the switching means of the emitter unit is 1.5 kHz for an acoustic "beep" corresponding to a "0" logic level, and 2.5 kHz for an acoustic "beep" corresponding to a "1" logic level.

* * * * *